US009184687B2

(12) United States Patent
Handa (10) Patent No.: US 9,184,687 B2
(45) Date of Patent: Nov. 10, 2015

(54) MOTOR CONTROL APPARATUS AND MOTOR CONTROL METHOD (71) Applicant: DENSO CORPORATION, Kariya, Aichi-pref. (JP)

(72) Inventor: Go Handa, Chiryu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/374,261

(22) PCT Filed: Feb. 14, 2013

(86) PCT No.: PCT/JP2013/000788
§ 371 (c)(1),
(2) Date: Jul. 24, 2014

(87) PCT Pub. No.: WO2013/125183
PCT Pub. Date: Aug. 29, 2013

(65) Prior Publication Data
US 2015/0084555 A1    Mar. 26, 2015

(30) Foreign Application Priority Data

Feb. 22, 2012  (JP) ................................ 2012-036547

(51) Int. Cl.
*H02P 21/00* (2006.01)
*H02P 27/08* (2006.01)
*H02P 21/06* (2006.01)

(52) U.S. Cl.
CPC ............ *H02P 21/0035* (2013.01); *H02P 21/06* (2013.01); *H02P 27/085* (2013.01)

(58) Field of Classification Search
CPC ............ G06F 11/2097; G06F 11/2007; G06F 11/2028; H02P 1/0035; H04B 1/74
See application file for complete search history.

(56) References Cited

U.S. PATENT DOCUMENTS

| 2008/0001571 A1* | 1/2008 | Tomigashi .................... 318/721 |
| 2010/0262307 A1 | 10/2010 | Imura |

(Continued)

FOREIGN PATENT DOCUMENTS

| JP | H08-098588 A | 4/1996 |
| JP | 2008-228419 A | 9/2008 |
| JP | 2010-166716 A | 7/2010 |
| JP | 2011-199999 A | 10/2011 |

(Continued)

OTHER PUBLICATIONS

International Search Report and Written Opinion of the International Searching Authority mailed Apr. 23, 2013 for the corresponding international application No. PCT/JP2013/000788 (and English translation).

*Primary Examiner* — Shawki S Ismail
*Assistant Examiner* — Zoheb Imtiaz
(74) *Attorney, Agent, or Firm* — Posz Law Group, PLC (57) ABSTRACT

A motor control apparatus includes a calculator, a determinator, and a selector. The calculator calculates a zero vector current predicted to flow through a three-phase AC motor when an inverter operates in a first mode for applying no voltage to the motor. The determinator determines whether a difference between the zero vector current and a command current on a $\alpha\beta$ stationary coordinate system falls within an allowable range. The selector selects the first mode as a switching mode of the inverter when the difference falls within the allowable range, and selects a second mode as the switching mode of the inverter upon determination that the difference falls outside the allowable range. The second mode corresponds to a non-zero current vector closest to the command current among six non-zero current vectors defined in fixed directions with respect to the zero vector current on the $\alpha\beta$ stationary coordinate system.

10 Claims, 6 Drawing Sheets

(56) References Cited

U.S. PATENT DOCUMENTS

2013/0214711 A1* 8/2013 Omata et al. ............. 318/400.02
2014/0167659 A1* 6/2014 Handa ...................... 318/400.02

FOREIGN PATENT DOCUMENTS

| | | |
|---|---|---|
| JP | 2011-200000 A | 10/2011 |
| JP | 2011-259637 A | 12/2011 |

* cited by examiner

FIG. 2

| SWITCHING MODE (VOLTAGE VECTOR) | SWITCHING DEVICE TO BE TURNED ON | | |
|---|---|---|---|
| | U PHASE | V PHASE | W PHASE |
| V0 | LOWER | LOWER | LOWER |
| V1 | UPPER | LOWER | LOWER |
| V2 | UPPER | UPPER | LOWER |
| V3 | LOWER | UPPER | LOWER |
| V4 | LOWER | UPPER | UPPER |
| V5 | LOWER | LOWER | UPPER |
| V6 | UPPER | LOWER | UPPER |
| V7 | UPPER | UPPER | UPPER |

MOTOR CONTROL APPARATUS AND MOTOR CONTROL METHOD

CROSS REFERENCE TO RELATED APPLICATION

The present application is a U.S. national stage application of PCT/JP2013/000788 filed on Feb. 14, 2013 and is based on Japanese Patent Application No. 2012-36547 filed on Feb. 22, 2012, the contents of which are incorporated herein by reference.

TECHNICAL FIELD

The present invention relates to a motor control apparatus and motor control method for controlling a rotation of a three-phase AC motor by determining a switching mode of an inverter so that a current flowing through the three-phase AC motor can be equal to a command current and by causing the inverter to operate in the determined switching mode so that a voltage depending on the switching mode can be applied to the three-phase AC motor.

BACKGROUND ART

A triangle wave comparison PWM control method has been generally known as the motor control apparatus and motor control method described above. In this control method, a command voltage for each phase is calculated based on a difference between a current command value and a current flowing through each phase, and a switching mode of an inverter is determined based on whether the calculated command value is larger or smaller than a carrier having a triangle wave shape.

As disclosed in, for example, a patent document 1 and a patent document 2, a technique for improving current responsivity in this triangle wave comparison PWM control method has been known.

In a control method disclosed in the patent document 1, a future current (torque) in each switching mode of an inverter is predicted by using a motor model based on a current flowing through a motor, a position of a magnetic pole of a rotor, and a rotation speed of the rotor. Then, a switching mode is selected so that a difference between the future current (torque) and a current (torque) command value for controlling the motor can be minimized, and the inverter is driven in the switching mode.

In the patent document 2, to perform the model prediction control disclosed in the patent document 1 more accurately, a predicted current ide (n+1), iqe(n+1) one control cycle ahead is calculated based on a present voltage vector (switching mode) V(n) of an inverter. Then, a predicted current ide (n+2), iqe(n+2) further one control cycle ahead is calculated for each voltage vector V(n+1) by using the predicted current ide (n+1), iqe(n+1) as an initial value. Then, by using an evaluation function J to which the predicted current ide (n+2), iqe(n+2) is inputted, a voltage vector V(n+1) one control cycle ahead is determined so that a difference from a command current can be minimized.

In the techniques disclosed in the patent document 1 and the patent document 2, a future current which will flow through a motor is predicted for each switching mode (each voltage vector) of an inverter, and a switching mode is selected so that a difference between the future current and a command current can be minimized.

Therefore, there is a problem in that a calculation processing load for determining the switching mode for driving the motor is increased. In particular, this problem will be more serious if the motor model is constructed as a complicated mode in consideration of an inductance L, a non-linearity of the number of flux linkages $\phi$, and a disturbance.

Further, there is a need that the calculation processing is completed within a control cycle of the motor. It is preferable that the control cycle of the motor be set to a few microseconds to be equivalent to phase resolution of the triangle wave comparison PWM control method. When the calculation processing is implemented by hardware, serial processing cannot complete the calculation processing in time. Therefore, there is a need to perform parallel processing using a lot of processors or prepare a multidimensional state-space map (switching mode table) for determining a switching mode based on inputted state quantities such as a rotation speed and current. As a result, there arises a problem in that a circuit size is increased. In contrast, when the calculation processing is implemented by software, a high-performance microcomputer with high processing speed is needed. As a result, there arises a problem in that a cost is increased.

PRIOR ART

Patent Document

Patent Document 1: JP-A-2008-228419
Patent Document 2: JP-A-2010-252433

SUMMARY OF THE INVENTION

In view of the above, it is an object of the present disclosure to provide a motor control apparatus and a motor control method capable of significantly reducing a calculation processing load for determining a switching mode of an inverter to drive a motor.

According to a first aspect of the present disclosure, a motor control apparatus controls rotation of a three-phase AC motor by determining a switching mode of an inverter so that a current flowing through the three-phase AC motor becomes equal to a command current, whereby the inverter operates in the determined switching mode so that a voltage corresponding to the switching mode is applied to the three-phase AC motor.

The motor control apparatus includes a zero vector current calculator, a determinator, and a selector.

The zero vector current calculator calculates a prediction current, which is predicted to flow through the three-phase AC motor when the inverter operates in a zero vector switching mode for applying no voltage to the three-phase AC motor, as a zero vector current.

The determinator determines whether a difference between the zero vector current and the command current on a $\alpha\beta$ stationary coordinate system, which has an origin at a rotation axis of a rotor of the three-phase AC motor and is defined by a $\alpha$-axis and a $\beta$-axis which are perpendicular to each other, falls within an allowable range.

The selector selects the zero vector switching mode as the switching mode of the inverter upon determination that the difference between the zero vector current and the command current falls within the allowable range. The selector selects a non-zero vector switching mode as the switching mode of the inverter upon determination that the difference between the zero vector current and the command current falls outside the allowable range. The non-zero vector switching mode corresponds to a non-zero current vector closest to the command current among six non-zero current vectors defined in fixed directions with respect to the zero vector current on the αβ stationary coordinate system.

Thus, according to the first aspect of the present disclosure, the switching mode of the inverter capable of supplying an electric current closest to the command current to the three-phase AC motor can be determined by simply calculating the zero vector current. In other words, it is not necessary to calculate the non-zero vector currents at all to determine the switching mode of the inverter. Thus, a calculation processing load can be much reduced compared to the prior art.

It is noted that, on a αβ stationary coordinate system, vectors of currents flowing through the three-phase AC motor according to voltages applied by the six non-zero vector switching modes of the inverter are defined in fixed directions with respect to the zero vector current. Therefore, even when values of the non-zero vector currents themselves are not calculated, the vector of the current closest to the command current can be determined by plotting the command current on the same coordinate system. For this reason, it is not necessary to calculate the non-zero vector currents when selecting the non-zero current vector closest to the command current.

According to a second aspect of the present disclosure, a motor control method controls rotation of a three-phase AC motor by determining a switching mode of an inverter so that a current flowing through the three-phase AC motor becomes equal to a command current, whereby the inverter operates in the determined switching mode so that a voltage corresponding to the switching mode is applied to the three-phase AC motor.

The motor control method includes a zero vector current calculating step, a determining step, and a selecting step.

The zero vector current calculating step calculates a prediction current, which is predicted to flow through the three-phase AC motor when the inverter operates in a zero vector switching mode for applying no voltage to the three-phase AC motor, as a zero vector current.

The determining step determines whether a difference between the zero vector current and the command current on a αβ stationary coordinate system, which has an origin at a rotation axis of a rotor of the three-phase AC motor and is defined by a α-axis and a β-axis which are perpendicular to each other, falls within an allowable range.

The selecting step selects the zero vector switching mode as the switching mode of the inverter upon determination that the difference between the zero vector current and the command current falls within the allowable range. The selecting step selects a non-zero vector switching mode as the switching mode of the inverter upon determination that the difference between the zero vector current and the command current falls outside the allowable range. The non-zero vector switching mode corresponds to a non-zero current vector closest to the command current among six non-zero current vectors defined in fixed directions with respect to the zero vector current on the αβ stationary coordinate system.

According to the second aspect, the same effect as the first aspect can be obtained.

BRIEF DESCRIPTION OF THE DRAWINGS

The above and other objects, features and advantages of the present disclosure will become more apparent from the following detailed description made with reference to the accompanying drawings. In the drawings.

EMBODIMENTS OF THE INVENTION

First Embodiment

A motor control apparatus and a motor control method according to a first embodiment of the present disclosure are described below with reference to the drawings.

A motor 10 to be controlled by a motor control apparatus 30 according to the present embodiment is a three-phase AC synchronous motor having three-phase stator windings. According to the present embodiment, in particular, the synchronous motor 10 is a revolving field type synchronous motor (IPMSM) in which a permanent magnet is embedded in a rotor.

Figure 1:
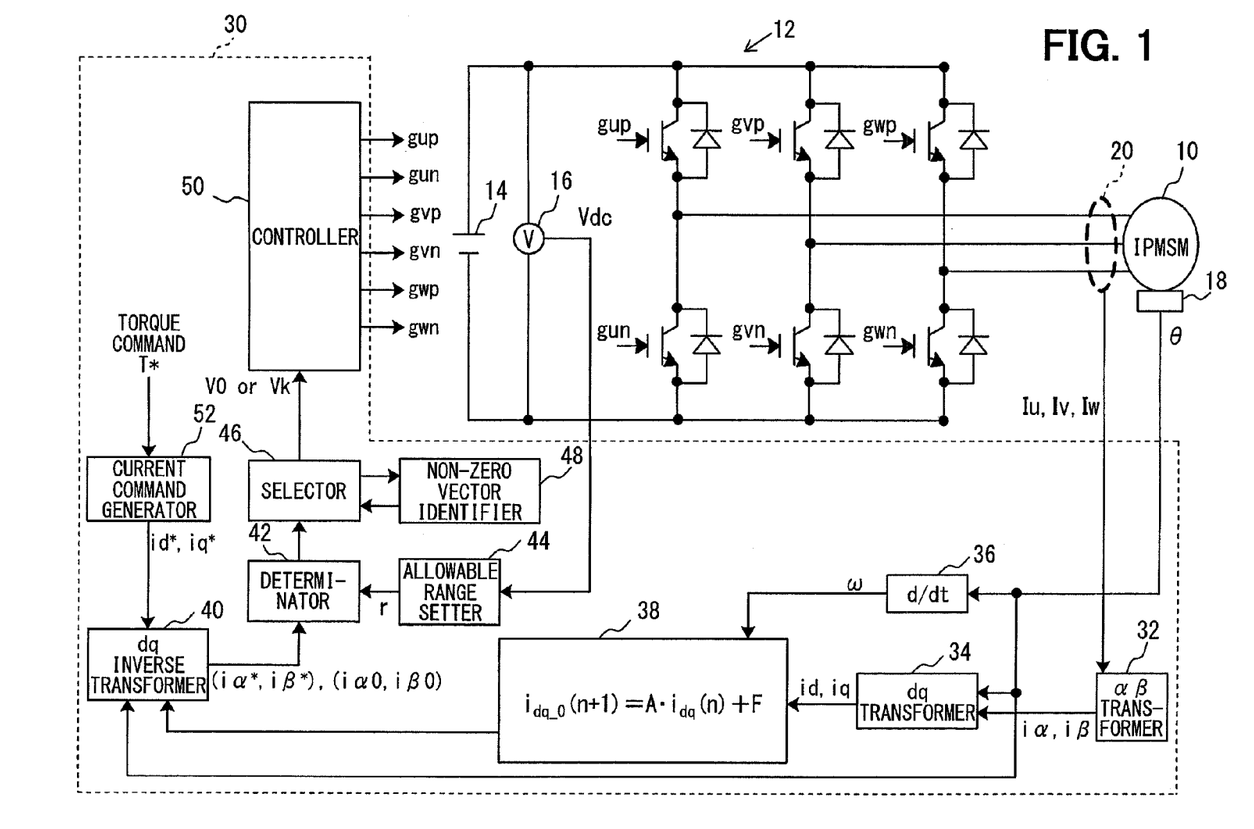
FIG. 1 is a block diagram of an entire configuration of a motor control apparatus according to a first embodiment.

As shown in FIG. 1, the motor 10 is connected through an inverter 12 to a power source 14. The inverter 12 has sixth switching devices (e.g., IGBTs) which are paired corresponding to U, V, and W phases of the motor 10. That is, in the inverter 12, a pair of high-potential-side and low-potential-side switching devices is provided to each phase of the motor 10 in such a manner that a wire connecting the high-potential-side and low-potential-side switching devices is connected to each phase of the motor 10. It is noted that each switching device is connected in parallel with a protection diode.

The motor control apparatus 30 outputs control signals gup, gun, gyp, gvn, gwp, and gwn to the switching devices of the inverter 12, thereby turning ON and OFF the switching devices of the inverter 12. As a result, the inverter 12 operates in various switching modes. The switching modes are sometimes referred to as the "voltage vectors".

Figure 2:
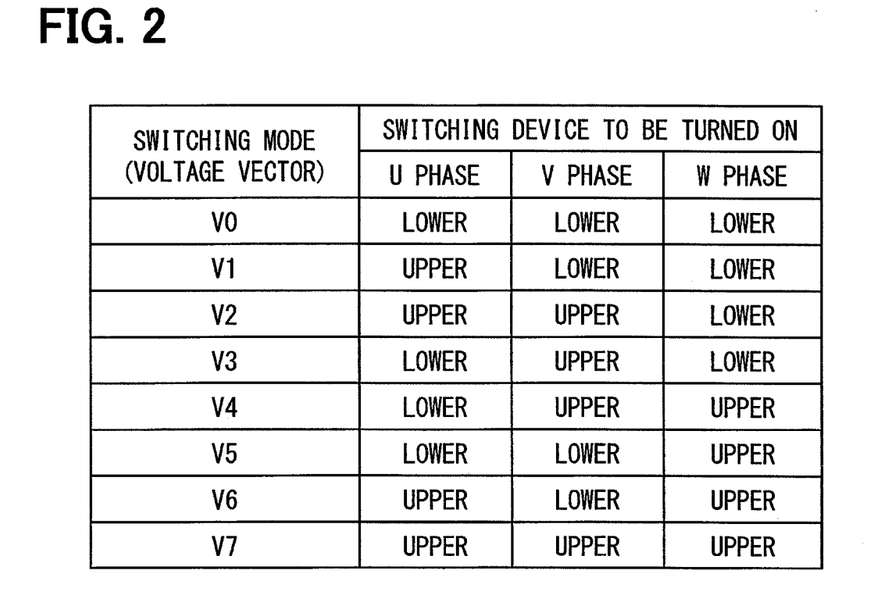
FIG. 2 is a diagram for explaining switching modes of an inverter.

The switching modes of the inverter 12 are described with reference to FIG. 2. As shown in FIG. 2, the number of the switching modes of the inverter 12 is eight. However, in a switching mode V0 and a switching mode V7, only the low-potential-side switching device of each phase or only the high-potential-side switching device of each phase is turned ON. In both the switching mode V0 and the switching mode V7, an inverter voltage is not applied to the motor 10. Therefore, only one of the switching mode V0 and the switching mode V7 may be used. Alternatively, either the switching mode V0 or the switching mode V7 may be selected arbitrarily according to the switching mode of the inverter 12 before the switching. It is noted that the switching modes V0 and V7 are referred to as the "zero vector switching mode".

In contrast, in each of the remaining switching modes V1-V6 other than the switching modes V0, V7, the switching device to be turned ON exists on both the high-potential side and the low-potential side. Accordingly, in the switching modes V1-V6, a voltage with a vector corresponding to the switching device to be turned ON is applied to the motor 10, and a current with a vector corresponding to the applied voltage flows through the motor 10. Therefore, the switching modes V1-V6 are collectively referred to as the "non-zero vector switching mode".

A voltage sensor 16 for detecting an input voltage to the inverter 12 is connected in parallel to the power source 14. An inverter input voltage Vdc detected by the voltage sensor 16 is supplied to the motor control apparatus 30. Further, a rotation angle sensor 18 for detecting a rotation angle (magnetic pole position of a rotor) θ of the motor 10 is provided, and a current sensor 20 for detecting currents Iu, Iv, and Iw flowing through the phases (U, V, and W phases) of the motor 10 is provided. Detection signals of the rotation angle sensor 18 and the current sensor 20 are supplied to the motor control apparatus 30.

Next, an internal configuration of the motor control apparatus 30 is described. The motor control apparatus 30 can be configured so that functions of blocks shown in FIG. 1 can be implemented by specific processors or configured so that the functions of blocks shown in FIG. 1 can be implemented by programs executed by a microcomputer.

The current detection values Iu, Iv, and Iw of the phases of the motor 10 detected by the current sensor 20 are inputted to a αβ transformer 32 and converted to a α-axis current value iα and a β-axis current value iβ on in a αβ coordinate. It is not always necessary that the current sensor 20 detects all the three phase currents. The conversion to the α-axis current value iα and the β-axis current value iβ can be performed by detecting at least two phase currents.

The α-axis current value iα and the β-axis current value iβ outputted from the αβ transformer 32 are inputted to a dq transformer 34. The dq transformer 34 converts the α-axis current value iα and the β-axis current value iβ to a d-axis current value id and a q-axis current value iq in a dq coordinate based on the motor rotation angle θ detected by the rotation angle sensor 18 and outputs the d-axis current value id and the q-axis current value iq to a zero vector current calculator 38.

As it is known, for example, the dq coordinate is a rotating coordinate which is defined by a q axis perpendicular to a d axis in a direction from a south pole to a north pole of the rotor, and the αβ coordinate is a stationary coordinate defined by a α-axis and a β-axis perpendicular to each other with respect to a rotation axis of the rotor as the origin. Since a relative phase relationship between the dq rotating coordinate and the αβ stationary coordinate can be identified by the motor rotation angle θ, coordinate transformation between the dq rotating coordinate and the αβ stationary coordinate can be performed.

The motor rotation angle θ detected by the rotation angle sensor 18 is inputted to a rotation angular velocity calculator 36, and a dq inverse transformer 40 in addition to the dq transformer 34. The rotation angular velocity calculator 36 calculates a motor rotation angular velocity (electrical angular velocity) ω by differentiating the motor rotation angle θ.

The zero vector current calculator 38 calculates a future zero vector current one control cycle ahead based on the motor rotation angular velocity (electrical angular velocity) ω, and the d-axis current value id and the q-axis current value iq indicative of the present motor current.

A vector current, including a zero vector current, predicted to flow through the motor 10 in each switching mode of the inverter 12 can be calculated by a formula 2 which is obtained by discretizing a formula 1 below.

$$\frac{d}{dt}\begin{bmatrix} id \\ iq \end{bmatrix} = \begin{bmatrix} -\frac{Ra}{Ld} & \omega\frac{Lq}{Ld} \\ -\omega\frac{Ld}{Lq} & -\frac{Ra}{Lq} \end{bmatrix}\begin{bmatrix} id_{(t)} \\ iq_{(t)} \end{bmatrix} +$$

$$\begin{bmatrix} \frac{1}{Ld} & 0 \\ 0 & \frac{1}{Lq} \end{bmatrix}\begin{bmatrix} vd \\ vq \end{bmatrix} + \begin{bmatrix} 0 \\ -\frac{\omega\phi}{Lq} \end{bmatrix}$$

[Formula 1]

$$i_{dq}(n+1) = A \cdot i_{dq}(n) + B \cdot v_{dq}(n) + F$$ [Formula 2]

In the formula 1, id represents a d-axis current, iq represents a q-axis current, Ra represents a wire resistance, Ld represents a d-axis inductance, Lq represents a q-axis inductance, vd represents a d-axis voltage, vq represents a q-axis voltage, ω represents a motor rotation angular velocity (electrical angular velocity), and φ represents the number of flux linkages.

In the formula 2, the left-hand side indicates a predicted current id(n+1), iq(n+1). The first term on the left-hand side indicates a present current id(n), iq(n) multiplied by a coefficient A and depends mainly on the present current. The second term on the left-hand side indicates an inverter voltage vd(n), vq(n) multiplied by a coefficient B and depends mainly on the inverter voltage. The third term on the left-hand side indicates F used to calculate a current induced by a speed electromotive force of the motor. The coefficients A, B are coefficient matrixes containing the wire resistance, the inductance, the motor rotation angular velocity, etc. In this way, the predicted vector current can be calculated mainly from the present current, the current inducted by the inverter voltage, and the current inducted by the speed electromotive force of the motor.

However, since the zero vector current is a current when the inverter voltage is zero, the zero vector current can be calculated based on the present current and the current induced by the speed electromotive force of the motor. Therefore, the zero vector current calculator 38 calculates the zero vector current from a formula 3 below based on known values including discrete time and motor parameters including the wire resistance, the inductance, and the number of flux linkages of the motor, the calculated motor rotation angular velocity (electrical angular velocity) ω, and the d-axis current value id and the q-axis current value iq indicative of the present motor current.

$$i_{dq0}(n+1) = A \cdot i_{dq}(n) + F$$ [Formula 3]

Then, the zero vector current calculator 38 outputs the calculated zero vector current id0, iq0 to the dq inverse transformer 40.

A current command generator 52 calculates a d-axis current command value id* and a q-axis current command value iq* based on a torque command value T* (or a velocity command value) supplied from outside. The d-axis current command value id* and the q-axis current command value iq calculated by the current command generator 52 are outputted to the dq inverse transformer 40.

The dq inverse transformer 40 reversely converts an inputted current value on the dq coordinate to a current value on the αβ coordinate based on the motor rotation angle θ detected by the rotation angle sensor 18. Specifically, the dq inverse transformer 40 reversely converts a zero vector current id0, iq0 on the dq coordinate to a zero vector current iα0, iβ0 on the αβ coordinate and reversely converts a current command value id*, iq* on the dq coordinate to a current command value iα*, iβ* on the αβ coordinate. Then, the dq inverse transformer 40 outputs the zero vector current iα0, iβ0 and the current command value iα*, iβ* on the αβ coordinate to a determinator 42.

Figure 3:
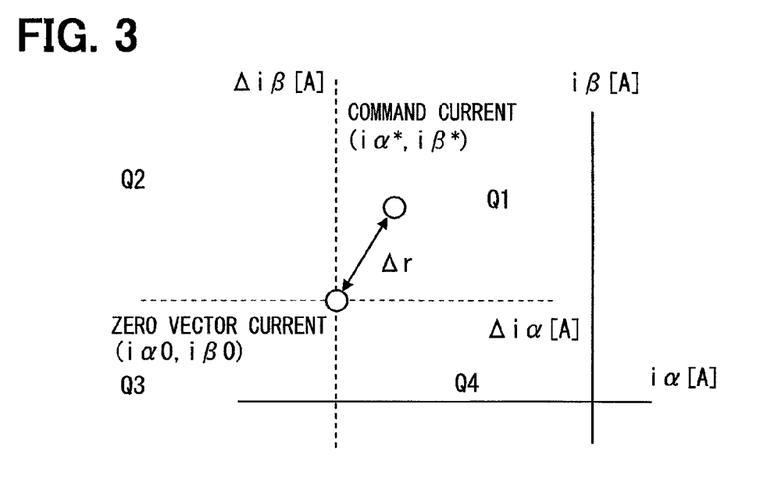
FIG. 3 is a graph of an example showing which of a first quadrant Q1 to a fourth quadrant Q4 a current command value $i\alpha^*$, $i\beta^*$ belongs to when a Δiα-axis and a Δiβ-axis are drawn on a αβ coordinate system with respect to a zero vector current $i\alpha 0$, $i\beta 0$ as the origin.

As shown in FIG. 3, the determinator 42 calculates a difference Δr between the zero vector current iα0, iβ0 and the current command value iα*, iβ* on the αβ coordinate and makes a comparison of the difference Δr with an allowable range r which is set by an allowable range setter 44. A result of the comparison is outputted to a selector 46. A method by which the allowable range setter 44 sets the allowable range r is described in details later.

When the comparison result which the selector 46 receives from the determinator 42 indicates that the difference Δr is smaller than the allowable range r, the selector 46 selects the zero vector switching mode V0 as a switching mode for the inverter 12 and outputs the zero vector switching mode V0 to a controller 50 of the inverter 12. A reason for this is that it is considered that a current close to the current command value iα*, iβ* can flow through the motor 10 by causing the inverter 12 to operate in the zero vector switching mode corresponding to the zero vector current id0, iq0.

In contrast, when the comparison result which the selector 46 receives from the determinator 42 indicates that the difference Δr is not smaller than the allowable range r, the selector 46 instructs a non-zero vector identifier 48 to indentify a non-zero vector current closest to the current command value iα*, iβ* to select the non-zero vector switching mode Vk as a switching mode for the inverter 12. A method by which the non-zero vector identifier 48 indentifies the non-zero vector current is described below with reference to FIGS. 3 and 4. Here, it is assumed that the non-zero vector identifier 48 has already received the zero vector current iα0, iβ0 and the current command value iα*, iβ* on the αβ coordinate through the determinator 42 and the selector 46. Alternatively, the non-zero vector identifier 48 can receive the zero vector current iα0, iβ0 and the current command value iα*, iβ* directly from the dq inverse transformer 40.

FIG. 3 shows which of a first quadrant Q1 to a fourth quadrant Q4 the current command value iα*, iβ* belongs to when a Δiα-axis and a Δiβ-axis are drawn on the αβ coordinate with respect to the zero vector current iα0, iβ0 as the origin. As shown in FIG. 3, firstly, the non-zero vector identifier 48 performs a quadrant determination to determine which of the first quadrant Q1 to the fourth quadrant Q4 the current command value iα*, iβ* belongs to. Specifically, the non-zero vector identifier 48 subtracts the zero vector current iα0, iβ0 from the current command value iα*, iβ* and determines which quadrant the current command value iα*, iβ* belongs to based on signs of a α-axis current value and a β-axis current value which are the results of the subtraction. FIG. 3 illustrates an example where the current command value iα*, iβ* belongs to the first quadrant Q1.

Then, the non-zero vector identifier 48 selects a non-zero current vector Iveck closest to the current command value iα*, iβ* from among non-zero current vectors Iveck1 to 6 passing the quadrant which the current command value iα*, iβ* belongs to.

Figure 4:
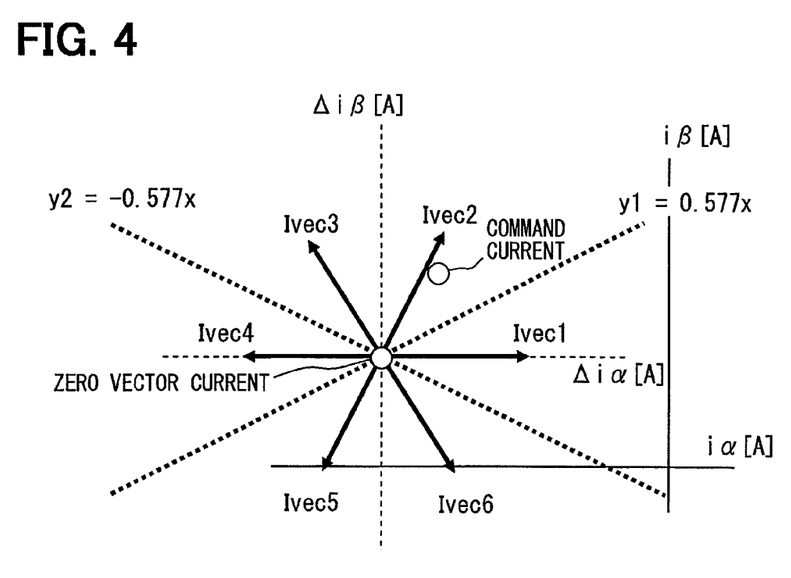
FIG. 4 is a diagram for explaining a method of identifying a current vector Iveck closest to a current command value $i\alpha^*$, $i\beta^*$.

As shown in FIG. 4, on the αβ coordinate system, the non-zero current vector Ivec1 to 6 flowing through the motor 10 according to voltages applied to the motor 10 by the six non-zero vector switching modes V1 to V6 of the inverter 12 are defined in fixed directions with respect to the zero vector current iα0, iβ0. Therefore, even when values of the non-zero vector currents, which flow through the motor 10 by the switching modes V1 to V6, themselves are not calculated, the non-zero current vector Iveck closest to the current command value iα*, iβ* can be identified.

In an example shown in FIG. 4, the current command value iα*, iβ* belongs to the first quadrant, and two non-zero current vectors Ivec1 and Ivec2 pass the first quadrant. Which of the current vectors Ivec1 and Ivec2 the current command value iα*, iβ* is closer to can be determined, for example, by determining whether the current command value iα*, iβ is located above or below a straight line (y1=0.577x) passing exactly midway between the non-zero current vectors Ivec1 and Ivec2. In the example shown in FIG. 4, since the current command value iα*, iβ is located above the straight line (y1=0.577x), it is identified that the closest non-zero current vector is Ivec1. Even when the current command value iα*, iβ* belongs to another quadrant, the closest non-zero current vector Iveck can be identified by the same procedure as described above.

The above-described method for identifying the non-zero current vector Iveck is effective, in particular, for a SPMSM (surface permanent magnet synchronous motor) having a d-axis inductance Ld and a q-axis inductance Lq which are equal to each other and a IPMSM (interior permanent magnet synchronous motor) having Ld and Lq which are close to each other. A reason for this is that when Ld and Lq are equal or close to each other, the non-zero current vector Ivec1 to 6 are defined in fixed directions having a phase difference of 60 degrees with respect to the zero vector current iα0, iβ0.

When the non-zero current vector Iveck closest to the current command value iα*, iβ* is identified in this way, the non-zero vector identifier 48 outputs the identified non-zero current vector Iveck to the selector 46. The selector 46 outputs the non-zero vector switching mode Vk, corresponding to the non-zero current vector Iveck received from the non-zero vector identifier 48, as a switching mode for the inverter 12 to the controller 50.

The controller 50 generates control signals in accordance with the inputted switching mode V0 or Vk and outputs the control signals to the inverter 12 to cause the inverter 12 to operate in the inputted switching mode V0 or Vk.

As described above, according to the present embodiment, when the difference Δr between the zero vector current iα0, iβ0 and the current command value iα*, iβ* is within the allowable range r, the zero vector switching mode V0 corresponding to the zero vector current iα0, iβ0 is selected as a switching mode for the inverter 12. In contrast, when the difference Δr is outside the allowable range r, the non-zero vector switching mode Vk corresponding to the non-zero current vector Iveck closest to the current command value iα*, iβ* is selected as a switching mode for the inverter 12.

Therefore, according to the present embodiment, there is no need to calculate the value of the non-zero vector current, and the switching mode of the inverter 12 capable of supplying an electric current closest to the current command value iα*, iβ* to the motor 10 can be determined by simply calculating the value of the zero vector current iα0, iβ0. In this way, it is not necessary to calculate the non-zero vector currents at all to determine the switching mode of the inverter 12. Thus, a calculation processing load for determining the switching mode of the inverter 12 by predicting the future current can be much reduced compared to the prior art.

As described above, according to the present embodiment, the switching mode of the inverter 12 is switched between the zero vector switching mode V0 and the non-zero vector switching mode Vk according to the result of the comparison between the allowable range r and the difference Δr between the zero vector current iα0, iβ0 and the current command value iα*, iβ*. Therefore, how to set the allowable range r is an important technical matter for the present embodiment. For this reason, a method of setting the allowable range r is described in detail below.

A first method of setting the allowable range r is to experimentally determine the allowable range r as a constant value in advance so that an error between the current command value id*, iq* (iα*, iβ*) and an actual current value id, iq (iα, iβ) can fall within a margin of error.

However, when the allowable range r is determined as a constant value, it is not necessarily expected that one of the zero vector current iα0, iβ0 and the non-zero vector current iαk, iβk closer to the current command value iα*, iβ* is always selected accurately. A reason for this is that a magnitude of the non-zero current vector Iveck as shown in FIG. 4 changes depending on variations in an inverter input voltage Vdc. Specifically, for example, even when the magnitude of the non-zero current vector Iveck increases, so that the current command value iα*, iβ* becomes closer to the zero vector current iα0, iβ0 than the non-zero vector current iαk, iβk, a situation may occur where the difference Δr exceeds the allowable range r. In contrast, even when the magnitude of the non-zero current vector decreases, so that the current command value iα*, iβ* becomes closer to the non-zero vector current iαk, iβk than the zero vector current iα0, iβ0, a situation may occur where the difference Δr falls within the allowable range r.

It is noted that even when a current vector (including a zero vector current) which is the second closet, not the most closest, to the current command value iα*, iβ* is selected, and the inverter 12 operates in a corresponding switching mode, adequate control can be made despite the fact that the error between the current command value id*, iq* and the actual current value id, iq increases somewhat.

A second method of setting the allowable range is to calculate (predict) the magnitude of the non-zero vector based on the inverter input voltage Vdc and sets the allowable range r to half the calculated value so that the error between the current command value id*, iq* and the actual current value id, iq be reduced.

As described above, the magnitude of the non-zero current vector Iveck changes depending on the amplitude of the inverter input voltage Vdc. Therefore, the magnitude of the non-zero current vector Iveck can be calculated (predicted) accurately by detecting the amplitude of the inverter input voltage Vdc. Further, since the allowable range r is set to half the magnitude of the calculated non-zero current vector Iveck, it is possible to determine which of the zero vector current iα0, iβ0 and the non-zero vector current iαk, iβk the current command value iα*, iβ* is closer to more accurately than by the first method.

For example, as shown in FIG. 1, the magnitude of the non-zero current vector can be calculated by calculating the second term on the right side of the formula 1 after the allowable range setter 44 obtains the input voltage Vdc of the inverter 12, performs the αβ transformation and the dq transformation, and obtains an inverter voltage vd, vq on the dq coordinate. A reason for this is that the second term on the right side of the formula 1 represents an electric current induced by the inverter voltage vd, vq, i.e., the magnitude of the non-zero current vector.

Further, in the case of the above-described SPMSM or the IPMSM having Ld and Lq which are close to each other, the magnitude of the non-zero current vector can be calculated simply by multiplying the detected inverter input voltage Vdc by a coefficient without using the method in which the magnitude of the non-zero current vector is calculated by calculating the second term on the right side of the formula 1.

Specifically, for example, the magnitude of the non-zero current vector can be calculated by obtaining only the switching mode (voltage vector) V1 shown in FIG. 2 from the detected inverter input voltage Vdc and multiplying an α-axis component of the voltage vector V1 by a known value including 1/Ld (or 1/Lq) and a discrete time. Since the non-zero current vector corresponding to each of the voltage vectors V1-V6 has the same magnitude, the magnitude of only one of the voltage vectors needs to be known. Reasons for this is that since a β-axis component of the voltage vector V1 on the αβ coordinate system is zero, the whole component of the inverter input voltage Vdc is reflected in the α-axis component, and since a difference between the αβ coordinate system and the dq coordinate system is only a difference between a stationary coordinate system and a rotating coordinate system, the magnitude of the non-zero current vector is the same between both the coordinate systems.

However, even the second method may incorrectly determine which of the zero vector current iα0, iβ0 and the non-zero vector current iαk, iβk the current command value iα*, iβ* is closer to. This point is specifically described with reference to FIG. 5.

In the second method, the allowable range r is set to half the magnitude of the non-zero current vector Iveck. Therefore, when the current command value iα*, iβ* is close to any one of the non-zero current vectors Ivec1-6, it is possible to accurately determine which of the zero vector current iα0, iβ0 and the non-zero vector current iαk, iβk the current command value iα*, iβ* is closer to.

Figure 5:
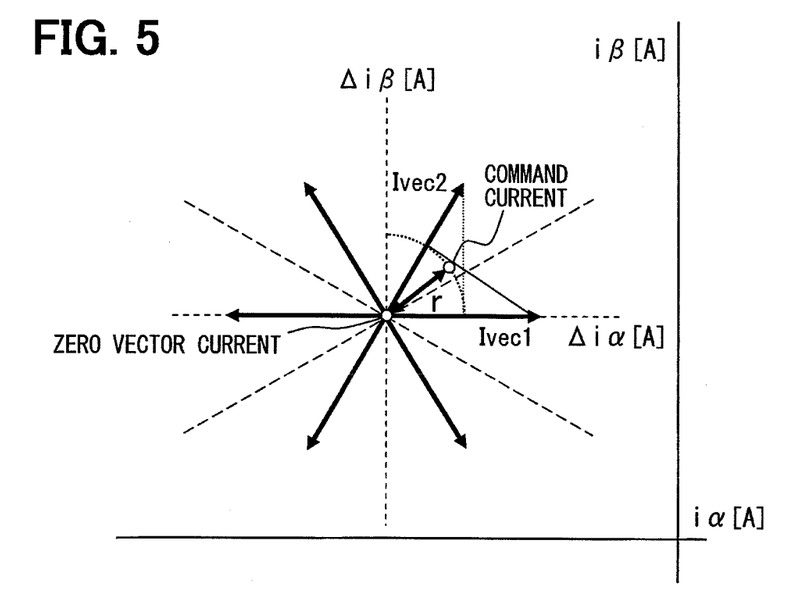
FIG. 5 is a diagram for explaining a third method for setting an allowable range r.

Here, it is assumed that the current command value iα*, iβ* is not close to the non-zero current vectors Ivec1-6. For example, as shown in FIG. 5, it is assumed that the current command value iα*, iβ* is between the non-zero current vectors Ivec1 and Ivec2 and closer to the non-zero current vector Ivec2. In this case, in order to accurately determine which of the zero vector current iα0, iβ0 and the non-zero vector current iα2, iβ2 the current command value iα*, iβ* is closer to, it is necessary to make the determination with respect to a normal (a line normal to the non-zero current vector Ivec2) extending from the midpoint of the non-zero current vector Ivec2.

However, since the second method sets the allowable range r to half the magnitude of the non-zero current vector Iveck, the determination is made with respect to an arc with a center of the zero vector current iα0, iβ0 as shown in FIG. 5. As can be seen from FIG. 5, a difference between the normal extending from the midpoint of the non-zero current vector Ivec2 and the arc with the center of the zero vector current iα0, iβ0 increases with a distance from the non-zero current vector Ivec2. Therefore, when the current command value iα*, iβ* is away from the non-zero current vector Ivec2, a possibility of incorrectly determining which of the zero vector current iα0, iβ0 and the non-zero vector current iα2, iβ2 the current command value iα*, iβ* is closer to increases.

Figure 6:
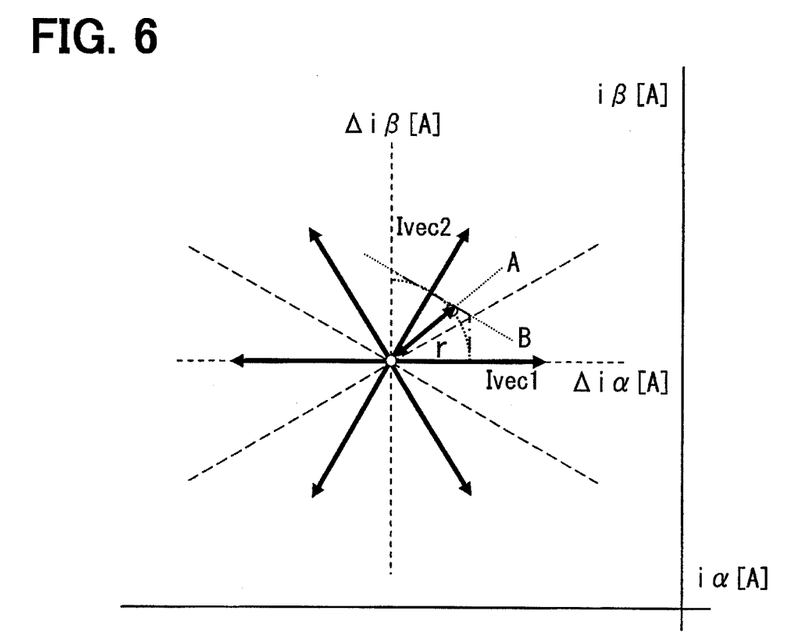
FIG. 6 is a diagram for explaining the third method for setting the allowable range r like FIG. 5.

For the above reason, as shown in FIG. 6, a third method of setting the allowable range is to set the allowable range r as a distance from the zero vector current iα0, iβ0 to a point of intersection between a straight line A connecting the zero vector current iα0, iβ0 to the current command value iα*, iβ* and a normal B extending from a midpoint of the non-zero current vector Iveck closest to the current command value iα*, iβ*.

It is noted that what is needed to allow the allowable range setter 44 to calculate the straight line A is that the zero vector current iα0, iβ0 and the current command value iα*, iβ* on the αβ coordinate, which are calculated by the dq inverse transformer 40, is outputted to the allowable range setter 44.

Further, what is needed to allow the allowable range setter 44 to calculate the normal B is that the non-zero vector current Iveck closest to the current command value iα*, iβ*, which is identified by the non-zero vector identifier 48, is outputted to the allowable range setter 44.

By setting the allowable range r in this way, even when the current command value iα*, iβ* is away from the non-zero current vector Iveck as shown in FIG. 6, it is possible to correctly determine which of the zero vector current iα0, iβ0 and the non-zero vector current iα2, iβ2 the current command value iα*, iβ* is closer to increases. Thus, it is possible to determine which of the zero vector current iα0, iβ0 and the non-zero vector current iαk, iβk the current command value iα*, iβ* is closer to more accurately than by the second method.

Although an explanation of a method of calculating a specific allowable range r is omitted, the straight line A can be calculated as a straight line passing two points, one of which is the zero vector current iα0, iβ0 as the origin and the other of which is the current command value iα*, iβ*. A straight line expressing the normal B can be calculated based on the fact that one side of a right triangle with sides in the ratio 1:2:square root of 3 is the non-zero current vector Ivec2. As long as the two straight lines A and B are calculated, it is easy to calculate the point of intersection of the lines, i.e., the allowable range r. Further, even when the current command value iα*, iβ* belongs to other quadrants unlike the example shown in FIG. 6, the allowable range r can be calculated by the same procedure as described above.

Next, a fourth method of setting the allowable range r is to detect an error between the actual current id, iq flowing through the motor 10 and the current command value id*, iq* when the allowable range r is increased or decreased and to adjust the allowable range r until the error becomes not greater than a predetermined value.

It is noted that the magnitude of the non-zero current vector Iveck changes depending on not only variations in the inverter voltage Vdc but also, for example, variations in a motor temperature, a motor rotation speed, the number of flux linkages, etc. Therefore, even when the magnitude of the non-zero current vector Iveck changes due to other factors besides the variations in the voltage applied to the motor 10, the allowable range r can be adjusted to a suitable value by adjusting the allowable range r based on the actual control result like the fourth method.

In the case of using the fourth method, for example, the error between the actual current id, iq flowing through the motor 10 and the current command value id*, iq* can be monitored, and the allowable range r can be adjusted when the error becomes equal to or greater than a predetermined value. Further, a direction in a change in the error when the allowable range r is increased or decreased can be monitored, and the allowable range r can be adjusted so that the allowable range r can change in an opposite direction when the error increases.

Finally, a fifth method of setting the allowable range r is to prestore a map which defines allowable ranges r to be used for changes in multiple parameters (for example, the motor temperature, the motor rotation speed, the number of flux linkages, etc.) which influence the magnitude of the non-zero current vector Iveck. Then, regarding the parameters, actual parameter values are detected by using sensors or the like, and an allowable range r corresponding to the detected parameter values is read from the map. In such an approach, like in the fourth method, even when the magnitude of the non-zero current vector Iveck changes due to various factors, the allowable range r can be set to a suitable value according to the change in the magnitude.

Figure 7:
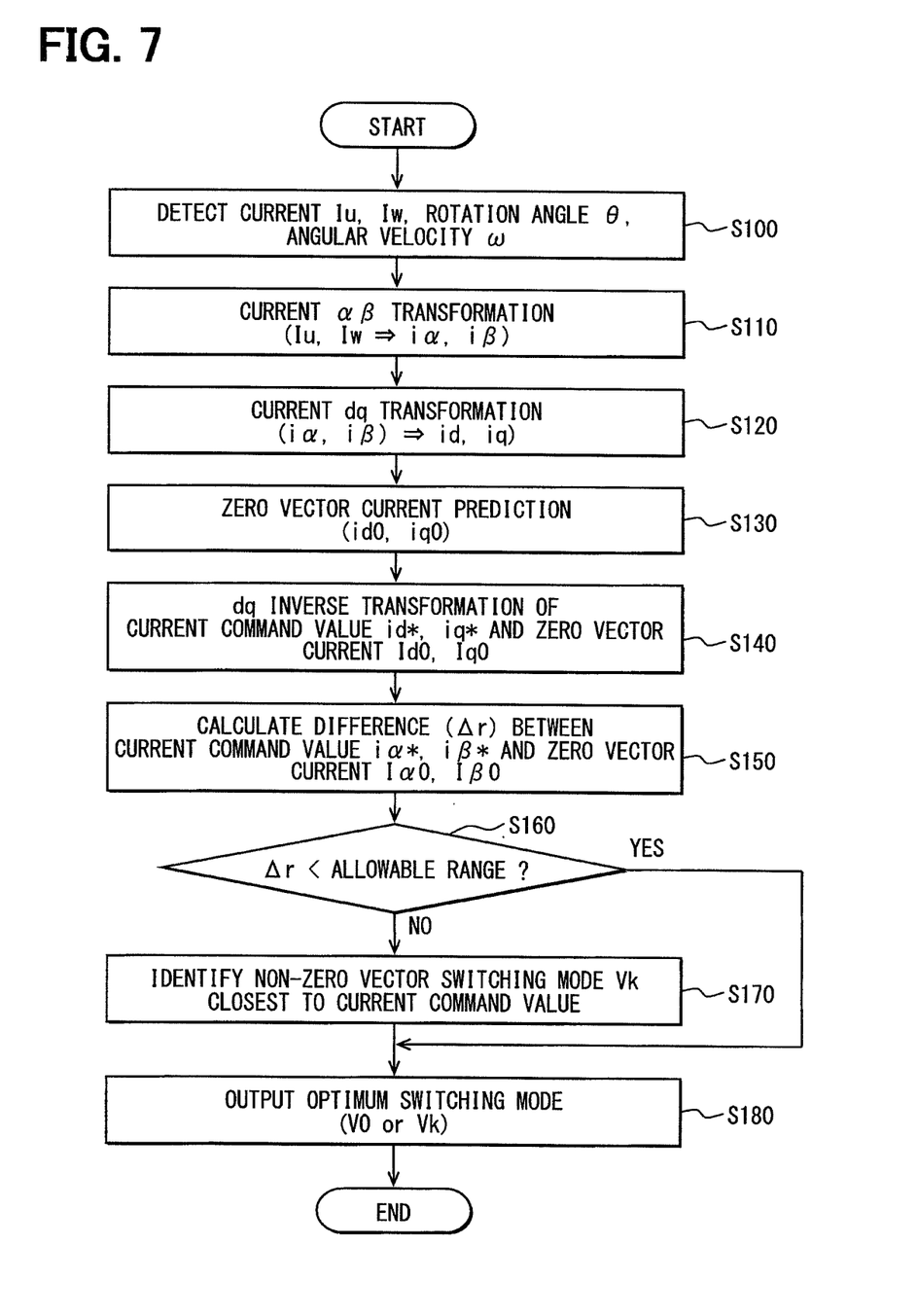
FIG. 7 is a flowchart illustrating a flow of a motor control process performed by the motor control apparatus according to the first embodiment.

Next a flow of a motor control process performed in the motor control apparatus 30 is described below with reference to a flowchart of FIG. 7. The process shown in FIG. 7 is repeated in a predetermined control cycle.

Firstly, at step S100, the current detection values Iu, Iw of the U phase and V phase are inputted from the current sensor 20, and the motor rotation angle θ is inputted from the rotation angle sensor 18. Further, the motor rotation angular velocity (electrical angular velocity) ω is calculated from the motor rotation angle θ.

Then, at step S110, the inputted current detection values Iu, Iw are converted to the α-axis current value is and the β-axis current value iβ on the αβ coordinate. Then, at step S120, the α-axis current value is and the β-axis current value iβ are converted, based on the motor rotation angle θ, to the d-axis current value id and the q-axis current value iq on the dq coordinate.

At step S130, the zero vector current id0, iq0 is calculated from the formula 3 based on known values including discrete time and motor parameters including the wire resistance, the inductance, and the number of flux linkages of the motor, the calculated motor rotation angular velocity (electrical angular velocity) ω, and the d-axis current value id and the q-axis current value iq indicative of the present motor current. Then, at step S140, the zero vector current id0, iq0 on the dq coordinate is reversely converted to the zero vector current iα0, iβ0 on the αβ coordinate, and the current command value id*, iq* on the dq coordinate is reversely converted to the current command value iα*, on the αβ coordinate.

At step S150, the difference Δr between the zero vector current iα0, iβ0 and the current command value iα*, iβ* is calculated on the αβ coordinate. Then, at step S160, it is determined whether the difference Δr is smaller than the allowable range r by any of the above-described methods. If it is determined at step S160 that the difference Δr is smaller than the allowable range r, the flow skips step S170 and proceeds to step S180 where the zero vector switching mode V0 is outputted as an optimum switching mode for the inverter 12. In contrast, if it is determined at step S160 that the difference Δr is not smaller than the allowable range r, the flow proceeds to step S170.

At step S170, the non-zero vector current Iveck closest to the current command value iα*, iβ* on the αβ coordinate is identified, and the non-zero vector switching mode Vk corresponding to the non-zero vector current Iveck is identified. Then, at step S180, the non-zero vector switching mode Vk is outputted as an optimum switching mode for the inverter 12.

Second Embodiment

A motor control apparatus and a motor control method according to a second embodiment of the present disclosure are described below with reference to FIG. 8. The same structures as those of the motor control apparatus of the first embodiment are denoted by the same reference numbers, and their description is omitted.

The motor control apparatus 30 of the first embodiment includes the voltage sensor 16 for detecting the input voltage to the inverter 12, and the input voltage detected by the voltage sensor 16 is supplied to the allowable range setter 44.

Figure 8:
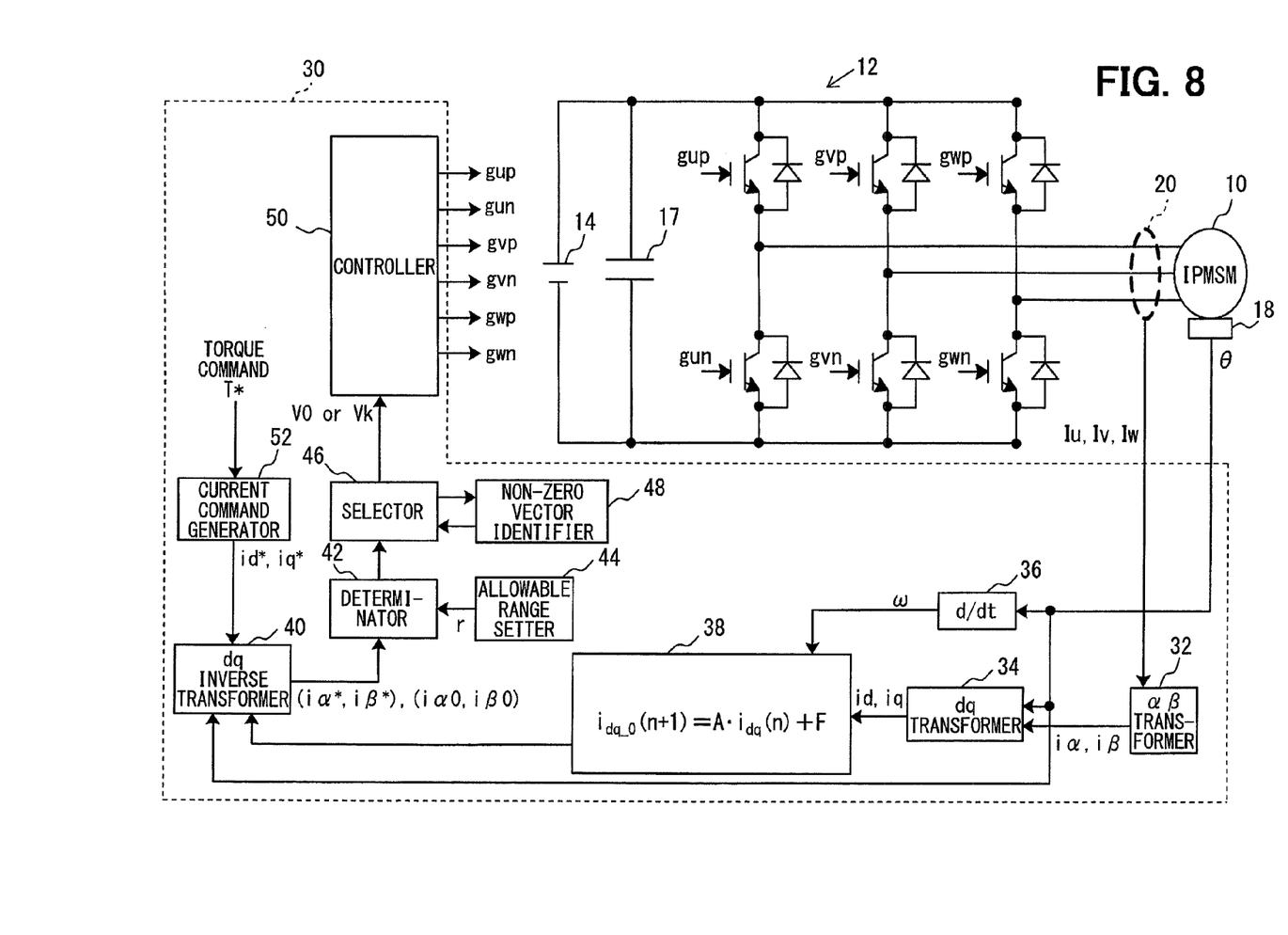
FIG. 8 is a block diagram of an entire configuration of a motor control apparatus according to a second embodiment.

However, for example, as shown in FIG. 8, when a capacitor. 17 having a relatively large capacitance is connected to the inverter 12 so that the input voltage to the inverter 12 can be kept almost constant, it is not necessary to take into account the input voltage Vdc to the inverter 12. Therefore, in this case, as shown in FIG. 8, the voltage sensor 16 can be removed.

In the case of using the structure shown in FIG. 8, it is not necessary to take into account variations in the input voltage Vdc to the inverter 12. Therefore, the allowable range setter 44 can set the allowable range r by any one of the first, fourth, and the fifth methods described in the first embodiment and the second and third methods modified so that the inverter input voltage Vdc can be considered as constant without being detected.

Other Embodiments

While the present disclosure has been described with reference to embodiments thereof, it is to be understood that the disclosure is not limited to the embodiments. The present disclosure is intended to cover various modifications and equivalent arrangements within the spirit and scope of the present disclosure.

For example, although the first and second embodiments are based on the case where an optimum switching mode one control cycle ahead should be determined. Alternatively, as described in, for example, the patent document 2, the present disclosure can be applied to a case where an optimum switching mode two control cycles ahead should be determined.

Further, the discrete time and the motor parameters, such as the wire resistance and the inductance, included in the prediction formula used in the prediction current calculator can be dynamically changed.

What is claimed is:

1. A motor control apparatus for controlling rotation of a three-phase AC motor by determining a switching mode of an inverter so that a current flowing through the three-phase AC motor becomes equal to a command current, whereby the inverter operates in the determined switching mode so that a voltage corresponding to the switching mode is applied to the three-phase AC motor, the motor control apparatus comprising:
a zero vector current calculator that calculates a prediction current as a zero vector current, the prediction current being predicted to flow through the three-phase AC motor when the inverter operates in a zero vector switching mode for applying no voltage to the three-phase AC motor;
a determinator that determines whether a difference between the zero vector current and the command current on a $\alpha\beta$ stationary coordinate system falls within an allowable range, the $\alpha\beta$ stationary coordinate system having an origin at a rotation axis of a rotor of the three-phase AC motor and defined by a $\alpha$-axis and a $\beta$-axis which are perpendicular to each other; and
a selector that selects the zero vector switching mode as the switching mode of the inverter upon determination that the difference between the zero vector current and the command current falls within the allowable range, the selector selecting a non-zero vector switching mode as the switching mode of the inverter upon determination that the difference between the zero vector current and the command current falls outside the allowable range, the non-zero vector switching mode corresponding to a non-zero current vector closest to the command current among six non-zero current vectors defined in fixed directions with respect to the zero vector current on the $\alpha\beta$ stationary coordinate system.

2. The motor control apparatus according to claim 1, further comprising:
a setter that sets the allowable range, wherein
the setter calculates a magnitude of the non-zero current vector based on an amplitude of the voltage applied to the three-phase AC motor and sets the allowable range to half the magnitude of the non-zero current vector.

3. The motor control apparatus according to claim 1, further comprising:
a setter that sets the allowable range, wherein
the setter calculates a magnitude of the non-zero current vector based on an amplitude of the voltage applied to the three-phase AC motor, calculates a distance from the zero vector current to a point of intersection between a straight line connecting the zero vector current to the command current and a normal extending from a midpoint of the non-zero current vector closest to the command current, and sets the allowable range to the distance.

4. The motor control apparatus according to claim 1, further comprising:
a setter that sets the allowable range, wherein
the setter detects an error between an actual current flowing through the three-phase AC motor and the command current when the allowable range is increased or decreased, and
the setter determines the allowable range by adjusting the allowable range until the error becomes not greater than a predetermined value.

5. The motor control apparatus according to claim 1, further comprising:
a setter that sets the allowable range, wherein
the setter prestores a map which defines allowable ranges to be used for changes in parameters which influence a magnitude of the non-zero current vector, and
when actual values of the parameters are detected, the setter determines the allowable range by reading a corresponding allowable range to the detected values from the map.

6. A motor control method for controlling rotation of a three-phase AC motor by determining a switching mode of an inverter so that a current flowing through the three-phase AC motor becomes equal to a command current, whereby the inverter operates in the determined switching mode so that a voltage corresponding to the switching mode is applied to the three-phase AC motor, the motor control method comprising:
a zero vector current calculating step of calculating a prediction current as a zero vector current, the prediction current being predicted to flow through the three-phase AC motor when the inverter operates in a zero vector switching mode for applying no voltage to the three-phase AC motor;
a determining step of determining whether a difference between the zero vector current and the command current on a $\alpha\beta$ stationary coordinate system falls within a allowable range, the $\alpha\beta$ stationary coordinate system having an origin at a rotation axis of a rotor of the three-phase AC motor and defined by a $\alpha$-axis and a $\beta$-axis which are perpendicular to each other; and
a selecting step of selecting the zero vector switching mode as the switching mode of the inverter upon determination that the difference between the zero vector current and the command current falls within the allowable range, the selecting step selecting a non-zero vector switching mode as the switching mode of the inverter upon determination that the difference between the zero vector current and the command current falls outside the allowable range, the non-zero vector switching mode corresponding to a non-zero current vector closest to the command current among six non-zero current vectors defined in fixed directions with respect to the zero vector current on the αβ stationary coordinate system.

7. The motor control method according to claim 6, further comprising:

a setting step of setting the allowable range, wherein the setting step calculates a magnitude of the non-zero current vector based on an amplitude of the voltage applied to the three-phase AC motor and sets the allowable range to half the magnitude of the non-zero current vector.

8. The motor control method according to claim 6, further comprising:

a setting step of setting the allowable range, wherein the setting step calculates a magnitude of the non-zero current vector based on an amplitude of the voltage applied to the three-phase AC motor, calculates a distance from the zero vector current to a point of intersection between a straight line connecting the zero vector current to the command current and a normal extending from a midpoint of the non-zero current vector closest to the command current, and sets the allowable range to the distance.

9. The motor control method according to claim 6, further comprising:

a setting step of setting the allowable range, wherein the setting step detects an error between an actual current flowing through the three-phase AC motor and the command current when the allowable range is increased or decreased, and the setting step determines the allowable range by adjusting the allowable range until the error becomes not greater than a predetermined value.

10. The motor control method according to claim 6, further comprising:

a setting step of setting the allowable range, wherein the setting step prestores a map which defines allowable ranges to be used for changes in parameters which influence a magnitude of the non-zero current vector, and when actual values of the parameters are detected, the setting step determines the allowable range by reading a corresponding allowable range to the detected values from the map.

\* \* \* \* \*